US009143545B1

(12) United States Patent
Barraclough et al.

(10) Patent No.: US 9,143,545 B1
(45) Date of Patent: Sep. 22, 2015

(54) DEVICE CLASSIFICATION FOR MEDIA DELIVERY

(75) Inventors: Keith Barraclough, Mountain View, CA (US); David Irvine, San Jose, CA (US)

(73) Assignee: Nokia Corporation, Espoo (FI)

( * ) Notice: Subject to any disclaimer, the term of this patent is extended or adjusted under 35 U.S.C. 154(b) by 708 days.

(21) Appl. No.: 11/700,345

(22) Filed: Jan. 31, 2007

Related U.S. Application Data

(63) Continuation-in-part of application No. 11/056,345, filed on Feb. 11, 2005, which is a continuation-in-part of application No. 09/843,249, filed on Apr. 26, 2001, now Pat. No. 7,139,834.

(51) Int. Cl.
*G06F 15/16* (2006.01)
*H04L 29/06* (2006.01)
(52) U.S. Cl.
CPC .................................. *H04L 65/605* (2013.01)
(58) Field of Classification Search
CPC ... H04L 12/28; H04L 65/605; H04L 65/1083; H04L 65/4084; G06Q 10/00; G06T 3/40
USPC .................................. 709/217–219; 726/2–8
See application file for complete search history.

(56) References Cited

U.S. PATENT DOCUMENTS

| | | | |
|---|---|---|---|
| 4,979,118 A | 12/1990 | Kheradpir | |
| 5,774,660 A | 6/1998 | Brendel et al. | |
| 5,862,325 A | 1/1999 | Reed et al. | |
| 5,920,701 A | 7/1999 | Miller et al. | |
| 5,996,022 A | 11/1999 | Krueger et al. | |
| 6,006,264 A | 12/1999 | Colby et al. | |
| 6,032,227 A | 2/2000 | Shaheen et al. | |
| 6,052,718 A | 4/2000 | Gifford | |
| 6,067,565 A | 5/2000 | Horvitz | |
| 6,112,225 A | 8/2000 | Kraft et al. | |
| 6,161,133 A | 12/2000 | Kikinis | |

(Continued)

FOREIGN PATENT DOCUMENTS

EP   1 376 398 A2   1/2004
JP   2002-132455 A   5/2002

(Continued)

OTHER PUBLICATIONS

May 25, 2000, Ben Hammer, "GPS to do wonders for wireless browsing" posted on the world wide web.

(Continued)

*Primary Examiner* — Chirag R Patel
(74) *Attorney, Agent, or Firm* — Ditthavong & Steiner, P.C.

(57) ABSTRACT

Media content is provided for remote playback over a packet-based network. According to an example embodiment of the present invention, a host server authenticates remote users and further processes media content requests from authenticated remote users by directing or otherwise facilitating the delivery of requested media content from a user's media content source to a remote playback device. The remote playback device is classified and the media content is selectively configured at one or both of the media content source and the host server in accordance with the classification, prior to delivery to the remote playback device. Communications among the host server, remote playback device and media content source are over the packet-based network.

24 Claims, 2 Drawing Sheets

(56) References Cited

U.S. PATENT DOCUMENTS

| | | | |
|---|---|---|---|
| 6,167,438 A | 12/2000 | Yates et al. | |
| 6,240,453 B1 | 5/2001 | Chang et al. | |
| 6,298,373 B1 | 10/2001 | Burns et al. | |
| 6,304,909 B1 | 10/2001 | Mullaly et al. | |
| 6,304,913 B1 | 10/2001 | Rune | |
| 6,308,209 B1 | 10/2001 | Lecheler | |
| 6,308,222 B1 | 10/2001 | Krueger et al. | |
| 6,360,333 B1 | 3/2002 | Jansen et al. | |
| 6,407,680 B1 | 6/2002 | Lai et al. | |
| 6,470,189 B1 | 10/2002 | Hill et al. | |
| 6,473,404 B1 | 10/2002 | Kaplan et al. | |
| 6,490,625 B1 | 12/2002 | Islam et al. | |
| 6,493,758 B1 | 12/2002 | McLain | |
| 6,496,980 B1 | 12/2002 | Tillman et al. | |
| 6,505,160 B1 | 1/2003 | Levy et al. | |
| 6,516,192 B1 | 2/2003 | Spaur et al. | |
| 6,577,601 B1 | 6/2003 | Wolpert | |
| 6,593,860 B2 | 7/2003 | Lai et al. | |
| 6,678,244 B1 | 1/2004 | Appanna et al. | |
| 6,697,333 B1 | 2/2004 | Bawa et al. | |
| 6,732,180 B1 | 5/2004 | Hale et al. | |
| 6,751,664 B1 | 6/2004 | Kogan et al. | |
| 6,801,777 B2 | 10/2004 | Rusch | |
| 6,826,597 B1 | 11/2004 | Lonnroth et al. | |
| 6,850,980 B1 | 2/2005 | Gourlay | |
| 6,871,236 B2 | 3/2005 | Fishman et al. | |
| 6,888,477 B2 | 5/2005 | Lai et al. | |
| 6,915,328 B2 | 7/2005 | Turnbull | |
| 6,920,637 B2 | 7/2005 | Mason et al. | |
| 6,937,168 B2 | 8/2005 | Rao et al. | |
| 6,993,508 B1 | 1/2006 | Major et al. | |
| 6,996,720 B1 | 2/2006 | DeMello et al. | |
| 7,010,500 B2* | 3/2006 | Aarnio | 705/26.8 |
| 7,035,828 B2 | 4/2006 | Ketonen et al. | |
| 7,075,919 B1 | 7/2006 | Wendt et al. | |
| 7,120,702 B2 | 10/2006 | Huang et al. | |
| 7,133,925 B2 | 11/2006 | Mukherjee et al. | |
| 7,139,834 B1 | 11/2006 | Albanese et al. | |
| 7,200,680 B2 | 4/2007 | Evans et al. | |
| 7,222,292 B2 | 5/2007 | Ali et al. | |
| 7,237,029 B2 | 6/2007 | Hino et al. | |
| 7,254,602 B1 | 8/2007 | Boivie | |
| 7,287,214 B1 | 10/2007 | Jenkins et al. | |
| 7,293,115 B2 | 11/2007 | DaCosta et al. | |
| 7,299,362 B2 | 11/2007 | Shen et al. | |
| 7,340,500 B2 | 3/2008 | Traversat et al. | |
| 7,356,615 B2 | 4/2008 | Cai et al. | |
| 7,483,958 B1 | 1/2009 | Elabbady et al. | |
| 7,502,819 B2 | 3/2009 | Alonso | |
| 7,805,315 B2* | 9/2010 | Goel | 705/1.1 |
| 7,827,312 B2 | 11/2010 | Ramaswamy et al. | |
| 7,895,445 B1 | 2/2011 | Albanese et al. | |
| 7,917,628 B2 | 3/2011 | Hesselink et al. | |
| 7,961,645 B2* | 6/2011 | Gudipudi et al. | 370/254 |
| 8,042,163 B1 | 10/2011 | Karr et al. | |
| 2001/0011349 A1 | 8/2001 | Garrison | |
| 2001/0047400 A1 | 11/2001 | Coates et al. | |
| 2002/0016922 A1 | 2/2002 | Richards et al. | |
| 2002/0026491 A1 | 2/2002 | Mason et al. | |
| 2002/0040389 A1 | 4/2002 | Gerba et al. | |
| 2002/0052798 A1 | 5/2002 | Nishikado et al. | |
| 2002/0052855 A1 | 5/2002 | Landesmann | |
| 2002/0052885 A1 | 5/2002 | Levy | |
| 2002/0056004 A1 | 5/2002 | Smith et al. | |
| 2002/0073057 A1 | 6/2002 | Benoit et al. | |
| 2002/0083342 A1 | 6/2002 | Webb et al. | |
| 2002/0099796 A1 | 7/2002 | Chou | |
| 2002/0103934 A1 | 8/2002 | Fishman et al. | |
| 2002/0107807 A1 | 8/2002 | Ketonen et al. | |
| 2002/0120574 A1 | 8/2002 | Ezaki | |
| 2002/0120607 A1 | 8/2002 | Price et al. | |
| 2002/0124098 A1 | 9/2002 | Shaw | |
| 2002/0133570 A1 | 9/2002 | Michel | |
| 2002/0133626 A1 | 9/2002 | Turnbull | |
| 2002/0161835 A1 | 10/2002 | Ball et al. | |
| 2002/0174246 A1 | 11/2002 | Tanay et al. | |
| 2002/0194324 A1 | 12/2002 | Guha | |
| 2003/0046401 A1 | 3/2003 | Abbott et al. | |
| 2003/0046703 A1 | 3/2003 | Knowles et al. | |
| 2003/0061387 A1 | 3/2003 | Brown et al. | |
| 2003/0088544 A1 | 5/2003 | Kan et al. | |
| 2003/0088686 A1 | 5/2003 | Jennings | |
| 2003/0110234 A1* | 6/2003 | Egli et al. | 709/217 |
| 2003/0119386 A1 | 6/2003 | Laux et al. | |
| 2003/0172186 A1 | 9/2003 | Dunn et al. | |
| 2003/0177269 A1 | 9/2003 | Robinson et al. | |
| 2003/0194998 A1 | 10/2003 | Bhide | |
| 2003/0200337 A1 | 10/2003 | Jabri et al. | |
| 2003/0204602 A1 | 10/2003 | Hudson et al. | |
| 2004/0003132 A1 | 1/2004 | Stanley et al. | |
| 2004/0032348 A1 | 2/2004 | Lai et al. | |
| 2004/0049462 A1* | 3/2004 | Wang | 705/50 |
| 2004/0117845 A1 | 6/2004 | Karaoguz et al. | |
| 2004/0122958 A1 | 6/2004 | Wardrop | |
| 2004/0139233 A1 | 7/2004 | Kellerman et al. | |
| 2004/0148434 A1 | 7/2004 | Matsubara et al. | |
| 2004/0148503 A1 | 7/2004 | Sidman | |
| 2004/0181706 A1 | 9/2004 | Chen et al. | |
| 2004/0199667 A1 | 10/2004 | Dobbins | |
| 2004/0243839 A1 | 12/2004 | Bhatia et al. | |
| 2004/0250291 A1 | 12/2004 | Rao et al. | |
| 2004/0267954 A1 | 12/2004 | Shen | |
| 2005/0033850 A1* | 2/2005 | Kirkland | 709/228 |
| 2005/0131871 A1 | 6/2005 | Howard et al. | |
| 2005/0132264 A1 | 6/2005 | Joshi et al. | |
| 2005/0148319 A1 | 7/2005 | Himeno | |
| 2005/0256870 A1 | 11/2005 | Benco et al. | |
| 2006/0117018 A1 | 6/2006 | Christiansen et al. | |
| 2006/0120385 A1* | 6/2006 | Atchison et al. | 370/400 |
| 2006/0168318 A1 | 7/2006 | Twiss | |
| 2006/0173974 A1 | 8/2006 | Tang | |
| 2006/0242325 A1 | 10/2006 | Ramaswamy et al. | |
| 2007/0159976 A1 | 7/2007 | Dekeyzer et al. | |
| 2007/0174471 A1 | 7/2007 | Van Rossum | |
| 2007/0288247 A1 | 12/2007 | Mackay | |
| 2007/0299681 A1* | 12/2007 | Plastina et al. | 705/1 |
| 2008/0049642 A1* | 2/2008 | Gudipudi et al. | 370/254 |
| 2008/0052415 A1 | 2/2008 | Kellerman et al. | |
| 2008/0060038 A1* | 3/2008 | Stallings et al. | 725/115 |

FOREIGN PATENT DOCUMENTS

| | | |
|---|---|---|
| JP | 2002-351729 A | 12/2002 |
| WO | WO 01/03373 A1 | 1/2001 |

OTHER PUBLICATIONS

Nov. 1999, "BackWeb® Foundation 5.5 Technical White Paper".
Office action for related U.S. Appl. No. 11/051,458 dated Mar. 8, 2011, pp. 1-41.
Office action for related U.S. Appl. No. 11/835,061 dated Mar. 2, 2011, pp. 1-20.
Supplementary European Search Report, PCT/US2007068985, Dec. 15, 2009, pp. 1-9.
Chinese Office action for correspondiong CN app. No. 200680041085.1 dated Jul. 9, 2010, pp. 1-22.
Chinese Office action for correspondiong CN app. No. 200680041085.1 dated Jul. 17, 2009, pp. 1-21.
European Office action for corresponding EP application No. 06718618.9-2413 dated Jan. 21, 2011, 1 page.
European Office action for corresponding EP application No. 06801968.6-2413 dated Feb. 1, 2011, 1 page.
Extended European search report for corresponding EP application No. 06718618.9-2413 dated Jan. 4, 2011, pp. 1-9.
Extended European search report for corresponding EP application No. 06801968.6-2413 dated Jan. 14, 2011, pp. 1-10.
International preliminary report on patentability for corresponding international application No. PCT/US06/32543 dated Jan. 3, 2008, pp. 1-5.
International search report and written opinion for corresponding international application No. PCT/US06/01565 dated Jun. 16, 2006, pp. 1-4.

(56) References Cited

OTHER PUBLICATIONS

International search report and written opinion for corresponding international application No. PCT/US06/32543 dated Jun. 5, 2007, pp. 1-7.
Office action for related U.S. Appl. No. 11/435,357 dated Jul. 29, 2010, pp. 1-24.
Office action for related U.S. Appl. No. 11/835,061 dated Sep. 15, 2010, pp. 1-22.
Office action for related U.S. Appl. No. 11/219,529 dated Oct. 7, 2010, pp. 1-29.
Server-directed transcoding, Mogul, J. C., Computer Communications 24, 2001, Elsevier, pp. 155-162.
Final Office Action for related U.S. Appl. No. 11/051,458, Aug. 18, 2011, pp. 1-18.
Office Action for related U.S. Appl. No. 11/219,529, Jun. 8, 2011, pp. 1-32.
Office Action for related U.S. Appl. No. 11/374,409, Jun. 8, 2011, pp. 1-31.
Office Action for related U.S. Appl. No. 11/408,140, Jul. 13, 2011, pp. 1-33.
Office Action for related U.S. Appl. No. 11/835,061, Jul. 13, 2011, pp. 1-30.
Russian Office action for corresponding RU application No. 2008149517/08(064991) dated May 20, 2011, pp. 1-11.
Office Action for Japanese Application No. 2009-511211 dated Oct. 4, 2011, pp. 1-5.
Office Action for U.S. Appl. No. 11/374,409 dated Oct. 28, 2011, pp. 1-19.
Office Action for related U.S. Appl. No. 11/408,140 dated Aug. 3, 2012, pp. 1-23.
Office Action for related European Application No. 07 797 483.0 dated May 3, 2012, pp. 1-5.
Office Action for related U.S. Appl. No. 11/435,344 dated May 3, 2012pp. 1-23.
Office Action for related U.S. Appl. No. 11/835,061 dated Jun. 7, 2012, pp. 1-15.
Examiner's Answer for related U.S. Appl. No. 11/835,061 dated Nov. 20, 2012, pp. 1-22.
Final Rejection for related U.S. Appl. No. 11/435,344 dated Oct. 26, 2012, pp. 1-25.
Office Action for related U.S. Appl. No. 11/056,345 dated Dec. 10, 2012, pp. 1-52.
Office Action for related Korean Patent Application No. 2008-7030536 dated Jan. 4, 2013, pp. 1-7.
Office Action for related Russian Patent Application No. 2011153102 dated Mar. 27, 2013, pp. 1-4.

\* cited by examiner

DEVICE CLASSIFICATION FOR MEDIA DELIVERY

RELATED PATENT DOCUMENTS

This patent document is a continuation-in-part of U.S. patent application Ser. No. 11/056,345 entitled "Network-distributed Media content Routing," filed Feb. 11, 2005; U.S. patent application Ser. No. 11/056,345 is also a continuation-in-part of U.S. patent application Ser. No. 09/843,249 filed on Apr. 26, 2001 and now U.S. Pat. No. 7,139,834; priority is claimed under 35 U.S.C. §120 to both of these documents for common subject matter.

FIELD OF THE INVENTION

The present invention relates generally to communications and, more particularly, to server-hosted configuration and routing of media to a remote media playback device in accordance with a classification of the media playback device.

BACKGROUND

Data communications over a variety of networks, such as packet-based networks, mobile telephone networks and others have increased at an astonishing rate over recent years. Generally, the affordability and availability of computers, telephones, wireless devices and other network access appliances has made their use prevalent in a variety of applications. Further, the availability network access, such as Internet access, in more environments and involving a multitude of communication mediums has increased dramatically, such that network access has become widely available and convenient.

As access to packet-based networks such as the Internet becomes easier, convenient and readily available, the demand for the use of these networks for transferring media content such as images, audio, email, video and text has increased. In this regard, the number of network subscribers, media content providers, and requests by those subscribers for media content transfer, streaming media content and other content are growing exponentially. Users are increasingly relying upon such networks for media content transfer, and are further placing higher expectations on their ability to access content at different locations using a multitude of different devices in a flexible, controllable manner. For instance, Internet access is evolving in application to implementation with a multitude of devices, such as mobile telephones, portable media playback devices, home audio and/or video media devices and systems, navigation systems, personal wireless devices and of course, notebook and desktop computers.

Media content (e.g., audio, images or video) has evolved in application, is often stored electronically and is readily transferable over packet-based networks as described above. For example, the storage of music and/or video in rewritable electronic media has become a popular method in which to maintain and access media collections. For video applications, digital recording and storage of television and personal video collections has become popular, as has the streaming (via the Internet) of stored video. Similarly, audio is often stored in electronic media, transferred to portable devices or streamed via the Internet using a packet-based approach to provide the audio to an Internet device such as a computer.

In many applications, remote access to media content by users owning or subscribing to the media content, or by guests with whom a user wishes to share her or his content, is desirably flexible and controllable. Further, such access is desirably implemented with a multitude of different types of media playback devices. For example, owners of digital audio content often desire access to their content with a variety of different devices, such those described in connection with example Internet access devices above. However, previous approaches to media access and sharing have been limited by the relative inability to controllably provide media content, and to provide media content that is accessible with different device types.

Effectively and efficiently making content and other media content readily accessible across a myriad of playback devices has been challenging in the face of the advancement of technologies and trade channels that use or could use network-based media transfer.

SUMMARY

The present invention is directed to approaches to providing host-controlled peer-to-peer access to registered-user data. The present invention is exemplified in a number of implementations and applications, some of which are summarized below.

According to an example embodiment of the present invention, an approach to the routing of data such as media content involves host-controlled authentication of a remote data recipient, classification of a remote device to be implemented by the remote data recipient, and host-controlled delivery of data form a registered-user's data source to the remote device.

According to another example embodiment of the present invention, a system facilitates the delivery of requested media content from a plurality of registered-user media content sources to classified remote playback devices over a packet-based network. The system includes a host server that communicates with remote users and the registered-user media content sources via the packet-based network, and authenticates remote users requesting the delivery of media content to a classified remote playback device. At each of a plurality of registered-user media content sources, an agent processor establishes a communication link with the host server over the packet-based network and is responsive to the host server to facilitate the delivery of media content from the media content source over the packet-based network. For media requests from authenticated remote users, the host server controls the agent processor at a registered-user media content source to facilitate the delivery of requested media content to a remote playback device over the packet-based network. Media content to be delivered from a registered-user media content source to a remote playback device is selectively configured, by at least one of the host server and the registered-user media content source, in accordance with a classification of the remote playback device.

In connection with the above and other embodiments herein, the term "agent processor" refers to a processor that is responsive to another communication device such as a host server. For example, the agent processor carries out functions involving the responsive communication of data and, in various applications, is programmed (e.g., via software or firmware) into a computer, router, mobile telephone, digital media device, modem or other processor-based device.

According to another example embodiment of the present invention, a system delivers media content over a packet-based network to a remote media playback device in accordance with a classification of the remote media playback device. The system includes an authentication server that authenticates users requesting media content delivery to a remote media playback device. A device classification engine associates device classes with a set of device classification rules. A browser gateway interacts with remote media playback devices and classifies each remote media playback device into one of the associated device classes, and an agent gateway interacts with registered-user media content sources. At each registered-user media content source, an agent processor interacts with the agent gateway via the packet-based network, and is responsive to the agent gateway for delivering media content to an authenticated user at a remote media playback device. The agent processor facilitates the media content delivery as a function of both the device classification of the remote media playback device and the device classification rules associated with the device class by the device classification engine.

The above summary of the present invention is not intended to describe each embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
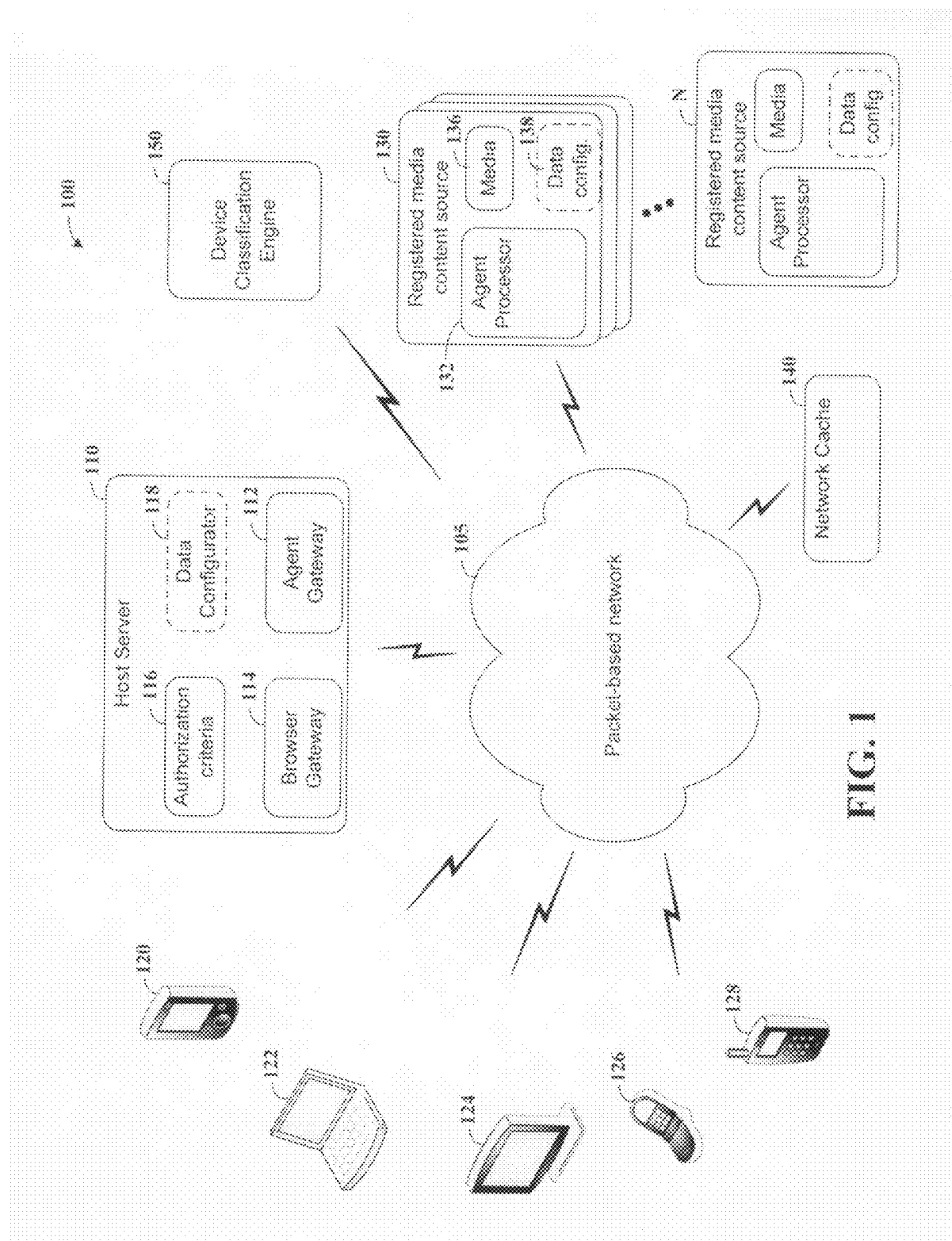
FIG. 1 is a system for hosted media configuration and routing over a packet-based network for playback at one of a variety of media playback device types, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of different types of communications, and the invention has been found to be particularly suited for routing media content, such as that available at a registered-user's content source, to a classified and authenticated remote media playback device. While the present invention is not necessarily limited to such applications, various aspects of the invention may be appreciated through a discussion of various examples using this context.

In connection with various example embodiments of the present invention, a host server interacts over a packet-based network with a registered user's data source and an authorized user at a remote packet-based device to facilitate the communication of data from the data source to the remote device over the network. In these applications, the remote user may be, for example, a registered user or a guest to which media content access has been granted. The host server uses authentication criteria to authenticate the remote user, and further classifies the remote packet-based device, prior to facilitating the delivery of media content to the remote user.

The classification identifies characteristics of the remote packet-based device relating to its ability to access data such as media content in one or more of a variety of manners. In some applications, the classification is attribute-based, with one or more device classes assigned one or more attributes. Attributes are generally characteristics that are identified in one or more manners, such as with a name and value (e.g., a named-value pair). For example, attributes may drive media transcoding for specifying a format to which media is to be transcoded prior to playback by a device having the particular device classification to which the attribute is assigned. Attributes may specify a specific communications protocol used by the particular device class, such as characteristics relating to device protocol support for different WAP (wireless application protocol) stacks that characterize the manner in which the remote device accesses data. Attributes may further specify characteristics relating to other device functionality such as user interface type (e.g., screen size and/or resolution).

For authenticated remote users, the host server interacts with the media content source to direct the delivery of media content from the content source to the remote media playback device over the packet-based network. The host server further facilitates the selective configuration (i.e., formatting) of the media content in accordance with the device classification (e.g., specifying transcoding parameters), or the selective delivery of data having an appropriate configuration.

One or both of the host server and the data source classify remote devices and store information, where appropriate, characterizing remote device classification. Classification information is obtained for remote devices using one or more of various approaches, either directly from the remote devices or using other information (e.g., device specification information) associated with the remote devices. Once classified, information characterizing the classification for each remote device is stored (e.g., at the data source) and used in selectively configuring or otherwise presenting data to the remote device. In some applications, device class configuration values are stored at the data source, support two or more device classes, and are implemented across various devices that operate under a particular configuration (e.g., several audio playback devices that are known to support mp3 audio format). With this approach, device-specific configuration can be avoided, thus making interaction with a multitude of different devices possible in a manageable environment.

The media content source has software-implemented functionality implemented via an agent processor that responds to controls received from the host server and facilitates communications between the host server and the content source. The media content source is generally either packet-based itself, or is coupled to a packet-based device to facilitate the delivery of media content from the media content source over a packet-based network. In this regard, the media content source, as referred to above and/or in other locations herein, generally refers to a single device and/or a system that is capable of both presenting media content for transfer over a packet-based network and of communicating over the packet-based network. For instance, one such device/system involves an Internet modem and a personal computer that stores and/or has access to media content directly or via a communications link such as a LAN. Other media content sources may include one or more of a media recorder (e.g., a digital video recorder or digital audio recorder), a broadcast receiving device (e.g., a television receiver, radio receiver or satellite receiver), a gaming device, a mobile telephone or other packet-communicating devices. The agent processor communicates with the host to establish a communications link therewith, and facilitates media content transfer at the direction of the host (or at the direction of user commands received from a remote registered user or a registered user at the content source), using class and/or classification data for a remote playback device to which the media content is to be transferred. In some applications, media content transfer is via the host, and in other instances, directly from the media content source to the remote media playback device.

The host server and/or the agent processor controls the format of media content in playlists to facilitate playback at one or more different remote media playback devices, using one or more different playback approaches, with delivery via one or more different types of communications mediums. In some applications, media content is stored in different formats amenable to playback with devices characterized by different device classes (and accordingly, playback media with different configurations). Generally, the host server and agent processor facilitate the establishment, management and delivery of media content in an appropriate format for playback using these approaches. Moreover, for various applications, in addition to device class, data is configured to suit one or more of a medium over which the data is to be delivered to the remote device and protection characteristics (e.g., media rights) associated with the data. In still other applications, the configuration of media data is made in accordance with a particular playlist, which maybe applicable for implementation at two or more different playback devices.

In another example embodiment of the present invention, the host server manages a network-based cache to store raw and/or configured data (e.g., media) for delivery to a remote-user device. The host server implements the agent processor to direct the population of the cache with media content from a registered-user's content source in an appropriate configuration, relative to various remote playback devices and their respective classifications.

The above discussion applies generally to a multitude of different systems, devices, networks and communications approaches. For illustrative purposes, the following discusses one particular example embodiment involving a media communications system and approach, aspects of which may be implemented using, for example, one or more of the approaches shown in and described above and/or in connection with the figures.

A user having a home-based local area network (LAN) registers with a host server for remote media content access, and installs agent software on a personal computer (PC) connected to the home LAN. The user (now a registered user) sets preferences, such as access criteria (user name, password), data such as media to make available for remote access, and local media sources from which to provide media.

Once registered, the user's PC connects to the host server upon power up or other condition, such as a user-initiated connection. The host establishes a persistent connection to the user's PC to facilitate remote access at a later time. The software programmed to the user's PC works with the host server to maintain this connection, and is responsive to commands from the host server in this regard, as well as for facilitating the transfer of data such as media content. In this regard and in the context of other example embodiments herein, the PC programmed with the agent software is an agent processor that interacts with the host server to facilitate the delivery of data. As a result, the user's PC can be implemented as the agent processor referred to in various example embodiments, by executing a program (the agent software).

When the registered user or a remote guest user wishes to remotely access data, the user accesses a web page hosted by the host server, by way of a packet-based remote-user device such as a computer or a hand-held wireless device (e.g., a media playback device or telephone). The user provides authentication information, such as the user name and password described above, and in response the host authenticates the user as an authorized user. The remote-user device is classified using one or more of information provided via the device, predefined information at the user's PC, or other information characterizing the remote Internet access device. Using this classification data, the host and user's PC work together to facilitate the delivery of data to the remote Internet access device (e.g., by controlling the PC via the agent software to stream the media content via the host server for playback at the remote Internet access device).

In some embodiments, the remote user (registered or guest) provides information to the host server characterizing a class or classification of the remote-user device, and this data is stored together with configuration information specifying a data configuration format to use in sending data to the remote-user device. In some applications, this information is provided directly, such as by the remote user making selections from a hosted web page to indicate a desired data type. In other applications, this information is provided indirectly, where the host server and/or PC (via the agent software) determines the type of remote device at which the remote user will be accessing delivered data.

In some applications, the host server determines a format type for data based not only upon a class or classification of a remote device, but further upon available communications mediums over which the data is to be delivered. For instance, the host server may facilitate delivery of high-bandwidth media content upon a determination that the remote-user device has access to a relatively high-bandwidth connection to the Internet, such as via a high-speed wired or Wi-Fi Internet connection, where such high-bandwidth media content is further in an appropriate format based upon the class or classification of the remote-user device. Similarly, the host server may automatically format media content to a relatively low-bandwidth format upon detection that delivery of the media content to the remote-user device will be over a relatively low-bandwidth connection and/or that communications links to the remote-use device are unreliable, also in accordance with an appropriate class/classification format.

The above approaches, as well as those discussed in the figures, are selectively implemented in connection with one or more example embodiments as described in U.S. patent application Ser. Nos. 09/843,249 and 11/056,345, to which priority is claimed above. For example, various approaches to media content transfer, user registration, media content caching, remote access and more, as described in U.S. patent application Ser. No. 11/056,345, are implemented to facilitate remote control of and access to media content such as media at a remote playback device as described herein. In addition, approaches to data delivery in accordance with various communications links and available remote packet-based devices may be implemented as described in U.S. patent application Ser. No. 09/843,249, now U.S. Pat. No. 7,139,834.

In connection with the examples described herein, a registered-user data source from which data is transferred includes a packet-communicating device such as one or more of a personal computer, set top box, web camera, media renderer or content storage system at a home or business location with network access, or any combination thereof. Furthermore, a remote user (e.g., using a remote packet-based device) may include one or more individuals, such as members of a household, employees of a business entity or simply an individual given access authorization by a registered user. In addition, a remote-user device generally includes one or more packet-based devices that facilitate communications over a packet-based network to receive data such as media content, as well as a device that is not necessarily packet-based. Further, a "user" may be a machine functioning automatically, for example, as programmed by an individual.

In the context of various examples described herein and shown in the figures, reference is made to several representative devices, networks and network communication approaches. Various terms such as Internet, web-enabled, packet, packet-based and others may be applicable in the context of different embodiments to facilitate the description of different examples. However, the devices, networks and network communications approaches described in connection with example embodiments herein may be applicable to variety implementations and descriptive terms. For instance, devices that could be described as a packet-based device may include one or more devices that communicate over a path characterized by one or more of a packet-communicative, web-based and/or Internet-based communications links. In this regard, devices referred to as packet-based or Internet-related are selectively implemented using one or more of a variety of packet-communicative approaches, and may include a combination of devices including a device that accesses a packet-based network and another device that is not necessarily packet-based. In addition, such devices may, for example, access the Internet via non-Internet-based communications approach, such as via one or more wired and/or wireless links that use one or more of a variety of communications approaches. Moreover, packet-communicative approaches described herein are applicable to a variety of network communications approaches, including those involving communications referred to in connection with one or more terms relating to packet, frame, block, cell and segment terms.

Turning now to the figures, FIG. 1 shows a system 100 for hosted media routing with device-specific classification and selective configuration, using a packet-based network to facilitate playback at one of a variety of media playback device types, according to another example embodiment of the present invention. The system 100 includes a network-based (host) server 110, a plurality of remote packet-based playback devices 120, 122, 124, 126 and 128, a plurality of registered media content sources 130-N, all of which communicate over a packet-based network 105.

The network 105 includes one or more packet-based networks such as the Internet and, where appropriate, other networks such as a mobile telephone network or a local area network (LAN). In some applications, the network 105 is a local area network implemented for a local premise such as a home or business. In other applications, the network 105 is (or includes) a virtual network or set of virtual application communication channels within a processor or group of processors associated with a computing appliance.

Each of the registered media content sources 130-N includes an agent processor that facilitates communication between the registered media content source and the network-based server 110. Regarding content source 130, such an agent processor 132 directs the selective routing of media content 136 from the registered media content source over the packet-based network 105. In some applications, the agent processor 132 executes agent software downloaded to the content source 130 by the network-based server. In these contexts, the agent processors may be implemented, for example, with a personal computer or other device programmed with agent software functionality.

The remote packet-based devices 120-128 are shown by way of example as a multitude of different kinds of devices, which may implement similar or different media playback characteristics that relate to a device-type of classification (e.g., relating to hardware and/or software type). The devices 120-128 are respectively shown as a personal data assistant 120, laptop 122, video renderer 124 (e.g., a packet-based television) and different types of mobile phones 126 and 128. Such devices may also be implemented as one of the registered media content source 130-N in a manner not inconsistent with that described herein.

The network-based server 110 includes an agent gateway 112 that communicates with the agent processors at the registered media content sources 130-N and a browser gateway 114 that facilitates access by remote packet-based playback devices 120-M using authorization criteria 116. A device classification engine 150 classifies and/or provides data for classifying the remote devices 120-128 using, for example, attributes assigned to particular device classes as described above. In some applications, the device classification engine 150 is implemented separately as shown, and in other applications, is implemented as part of the network-based server 110 (or an arrangement characterized by the same).

Each of the remote devices 120-128 is classified using information provided via the device classification engine 150, and the classification information is used in presenting data to the remote devices. In one example application, a particular set of configuration information (e.g., attributes) is associated with a particular device classification, the information is stored, and the stored information is later used in providing data to remote devices. When one of the remote devices 120-128 requesting data is classified (e.g., by the browser gateway 114), the configuration information corresponding to the classification is used to configure the data for use at the one of the remote devices (e.g., by the network-based server 110 and/or the registered media content source 130). In some applications, classification data for each remote device (e.g., classification and associated configuration data) provided by the device classification engine 150 is stored with a registered media content source to which the remote device seeks and/or is granted access.

In this regard, in response to requests from the remote devices 120-128, media or other data is sent to one of the respective remote packet-based devices with a configuration that is selected in accordance with a classification associated with the device. In some applications, media delivered from the registered media content sources 130-N is configured to a particular configuration relative to the device that the data is being delivered to. In other applications, media is stored at the media content sources 130-N in two or more configurations, and media with an appropriate configuration is accordingly selected and delivered to a requesting remote packet-base device in accordance with a classification of the device.

The configuration of data, or the selection of data in a particular configuration, is carried out at one or both of the network-based server 110 and one of the registered media content sources (130-N) from which the data is sent. Where data selection and/or configuration takes place at the network-based server 110, a configurator 118 carries out the appropriate processing. Where data selection and/or configuration are at the registered media content source from which the data is sent, a configurator 138 (using registered media content source 130 by way of example) carries out the appropriate action. The configurator 138 may, for example, be implemented with the agent processor 132, and downloaded to the registered media content source 130 by the host server 110.

The following approach to remote-user media content access is described in connection with FIG. 1 for one particular example embodiment. A registered user at the registered media content source 130 establishes an account with the network-based server 110 (e.g., for a fee), downloads agent software and installs the agent software at the registered media content source (for implementation by a processor carrying out functions as the agent processor 132).

Once the registered user has installed the agent software, registered for service and stores some sort of media content 136 for remote access, the registered user's media is made available for remote access. The agent processor 132 initiates a communications link with the agent gateway 112 at the network-based server 110 upon startup of the registered media content source 130 (e.g., upon startup of a computer at the registered user's home, which may store or otherwise have access to the media 136 and playlist data 138).

The link established between the agent processor 132 and the agent gateway 112 may be persisted, such that the network-based server 110 can access the registered user media content source 130 without necessarily requiring the at the content source be addressable. This approach is useful, for example, where the registered user content source 130 is a personal computer (PC) on a home network coupled to the Internet, which generally requires that the PC initiate a communications link via the Internet so that the network-based server 110 can in turn communicate with and control the agent processor 132 for directing the routing of media over the Internet.

A remote user at the remote playback device 120 accesses a web page hosted via the browser gateway 114, and provides authentication information such as a user name and password. The browser gateway 114 uses authorization criteria 116 to authenticate the remote user. In some applications, the authentication criteria specifies registered-user preferences, or media rights-base information, for controlling the media access by the remote user.

Once the browser gateway 114 authenticates the remote user, the remote user is presented with a web page characterizing media available at the registered media content source, with the agent gateway 112 retrieving this information from the agent processor 132. The user can then select one or more media files by providing the selections via the web page hosted by the browser gateway 114, and the agent gateway 112 in turn processes the selection by controlling the agent processor 132 to route (e.g., stream) the appropriate media content, via the Internet, to the network-based server 110. In turn, the network-based server 110 provides the media content to the remote packet-based playback device 120.

In another embodiment, the system 100 facilitates electronic token-based classification and access to registered user data as follows. When a user (e.g., owner) of registered media content source 130 wishes to share media content with another user, or to remotely access his or her own media content, the registered user directs the creation of an electronic token that specifies information that can be used to identify media content to which access is to be provided. The media content that is the subject of the token is made available, and in some instances pushed to the network cache 140, and the electronic token is provided for access by a remote user. When such a remote user implements the token (e.g., by providing the token with authorization information to the network-based server 110), the network-based server responds by directing appropriate content, having an appropriate configuration, to the requesting remote user. In some applications, the token includes format, bitrate or other information specifying characteristics of content to be provided via the token; where appropriate, media content is managed or modified by the agent processor 132, configurator 138 or configurator 118 to ensure that the content is available with the desired characteristics. Information for classifying the remote packet-based device making the request is either added to the token a the remote packet-based device or added by the user creating the token where such classification is known (e.g., where a registered user creates a token for a specific device). For general information regarding media content transfer, and for specific information regarding token-based media content transfer applications that may be implemented in connection with these and other example embodiments, reference may be made to U.S. patent application Ser. No. 11/374,414, entitled "Token-based Remote Data Access" and filed on Mar. 13, 2006, which is fully incorporated herein by reference.

In another example embodiment, the network-based server 110 also directs or otherwise controls the caching of media content in the network cache 140, and the delivery of cached media content to the remote packet-based playback devices 120-128. When a registered user at the registered media content source 130 subscribes to storing data in the network cache, the agent processor 132 pushes media content to the network cache 140 directly via the network 105 or via the network-based server 110. Similarly, the agent processor 132 provides media content to the cache 140 to reflect updates in a playlist stored at the cache.

Generally, the cached media content is accessed in a manner similar to that described above in connection with access to the media 136 at the registered media content source 130, with the network-based server 110 directing the delivery of content in the network cache in response to remote user access. The network-based server 110 also facilitates cache access in accordance with the media configuration available at the cache, relative to media available at a corresponding registered user content source. For instance, where requested data in a proper configuration is available in the cache, access to data in the cache may be preferred over access to data at a registered user content source. Based upon a classification of one of the devices 120-128 making a request, data from the cache 140 is configured to suit the classification at the network-based server 110, or if an appropriate configuration is available at the cache, the data with the appropriate conversion is directed for delivery from the cache to the requesting device.

Figure 2:
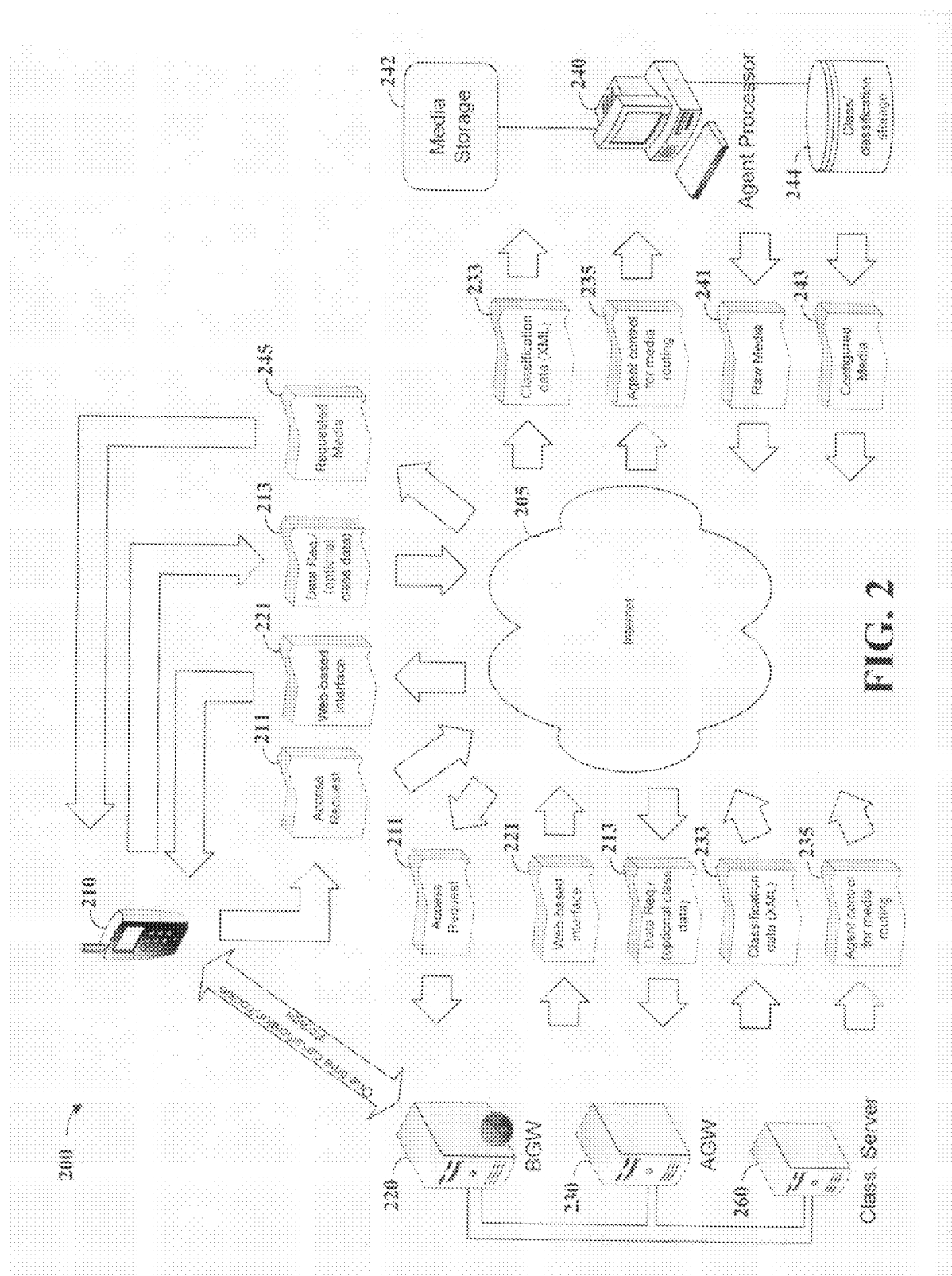
FIG. 2 is a data-flow diagram for a system and approach to device classification and host-controlled delivery of media content to a classified device, according to another example embodiment of the present invention.

FIG. 2 is a data-flow diagram for a system and approach 200 to device classification and host-controlled delivery of media content to a classified device, according to another example embodiment of the present invention. A browser gateway 220 interacts over the Internet 205 with a plurality of remote-user devices for classification of the devices and delivery of media thereto, using a browser-based interface (e.g., an Internet web page). An agent gateway 230 also interacts over the Internet, but with agent processors installed at a plurality of registered-user devices for directing the delivery of media content from the registered-user devices, over the Internet. In this regard, the browser gateway 220 interacts with remote users by way of a network-based interface without necessarily requiring any special software at devices via which remote users access the browser gateway, and the agent gateway 230 interacts specifically with registered user media sources. While applicable for a multitude of remote and registered users, FIG. 2 shows a single remote-user device 210 and a single registered-user media source 240 for simplicity.

The registered-user media source 240 is a computer or other packet-based device with processing functions suitable for communicating on the Internet 205 (e.g., using a modem) and with other local devices for the routing of media content (e.g., using a local area network). The media source 240 is also programmed with an agent processor that interacts with the agent gateway 230 to establish a connection with the agent gateway for use in serving media requests processed by the agent gateway for the media source 240. Local to the registered-user media source 240, a media storage device 242 and classification storage device 244 are connected to communicate with the registered-user media source. In some applications, one or both of the media storage device 242 and classification storage device 244 are implemented on the registered-user media source 240 (e.g., data stored on a hard drive of a computer), and in other applications, are separate as shown.

The media storage device 242 includes one of a multitude of media devices such as a digital video recorder, a digital audio recorder or a computer for storage of media such as images, video and/or audio. Agent software programmed at the registered-user media source 240 is implemented by an agent processor to make the stored media available, via the agent processor and agent gateway 230, to the remote-user device 210 in response to control inputs received from the agent gateway 230.

The classification storage device 244 includes one or more data storage devices such as a hard drive at the media source 240, a network-based hard drive, or an external hard drive connected to the media source (e.g., via a USB (universal serial bus) port), and stores classification information characterizing devices to which the media source 240 sends data. Classification and/or device class information is stored at the classification storage device 244 using one or more of a variety of approaches. In some applications, this classification information is provided by the agent gateway 230, via the Internet 205, using information obtained via the browser gateway 220 (and, for some applications, using a classification server 260 as described further below). In other applications, some or all of the classification information is provided directly to the media source 240 by a registered user of the media source. For instance, a registered user may establish device classification information by entering in data using a keyboard at the media source 240, either specifying a specific classification or a device type, with the media source determining (e.g., looking up) an appropriate classification based upon the device type in the latter instance. Alternatively and/or in combination with a data entry approach, the registered user may introduce a particular remote-user device (e.g., 210) to the media source 240 and facilitate the communication of information regarding the device's classification directly. Such communication between a remote-user device and the media source 240 may, for example, involve the connection of the two using a communications cable, or a wireless connection, either directly or using a local network such as a wireless LAN.

Generally, the browser gateway 220 and agent gateway 230 interact together to facilitate the classification of remote devices and the delivery of media content in an appropriate format (relating to the classification) to the classified remote devices. In some applications, the browser and agent gateways 220 and 230 are implemented together with a host system (e.g., on a common device or on separate devices connected together at a host location). In other applications, the browser and agent gateways 220 and 230 are implemented separately and communicate over a network such as a local area network, an intra-company network or the Internet 205.

The following description is made in connection with FIG. 2 and the system 200 by way of example, with example data flow shown in the figure and applicable here. However, the system 200 may be implemented with many different data-flow approaches, and further, the following data-flow description may be implemented in connection with one or more of a variety of different systems.

When a remote user at the remote-user device 210 wishes to access media content at the media storage device 242, the remote user implements the remote-user device and sends an access request 211 to the browser gateway 220. The request is made, for example, by clicking on and/or entering an appropriate URL (Uniform Resource Locator) for a web interface hosted by the browser gateway 220. In response to the request 211, the browser gateway 220 presents a web-based interface 221 to the remote-user device 210. The web-based interface 221 includes information and fields to suit particular applications, and for authenticated users, provides information sufficient for communicating media content selections depicting media available to the remote user from the registered-user media source 240.

The browser gateway 220 authenticates the remote user at the remote-user device 210 using one or more of a variety of approaches. In some applications, the browser gateway 220 presents the web-based interface 221 with fields to facilitate the entry of authentication information at the remote-user device 210 (e.g., the user enters a user name and password via the web-based interface). In other applications, the remote user provides authentication information with the request 211, such as information wrapped into the URL referenced above. In certain applications, authentication information is provided by way of an Internet cookie (i.e., information previously provided from the browser gateway 220 to the remote-user device 210) that is stored at the remote-user device and provided to the browser gateway with requests made at the remote-user device. In still other applications, authentication information is provided with later communications requesting data, with authentication performed on a request-by-request basis.

Using the web interface 221, the remote user requests media content by sending a data request 213 to the browser gateway 220, which responds by communicating agent control information 235 for media routing to the agent processor on the registered-user media source 240. The agent control information 235 directs the agent processor to route appropriate media content from the registered-user media source 240 and, where appropriate, to configure the content prior to routing. Where media content is available in an appropriate configuration in its raw form (e.g., the media storage device 242 has content in a format usable by the remote-user device 210), the registered-user media source 240 sends raw media content 241 to serve the agent control information 235 in providing media content to the remote-user device. Where media content is not available in an appropriate configuration, the registered-user media source 240 configures the media and sends configured media content 243 to server the agent control information 235 and provide media content to the remote-user device 210. Whether raw or configured media content (241 or 243) is provided, the content (in either form, represented by requested media 245) is directed to the remote-user device 210 via the agent processor and browser gateways 230 and 220, or directly from the registered-user media source 240 to the remote-user device 210 via the Internet 205.

Information characterizing the class and/or a classification of the remote-user device 210, such as that specifying attributes as described above, is made available for use in providing data to the remote-user device in one or more of a variety of manners, as discussed above. In some applications, device class and/or classification information characterizing the remote-user device 210 is obtained from the remote-user device 210 itself, or determined at the browser gateway 220 in accordance with other information identifying a type, model or other information about the remote-user device. The agent gateway 230 sends classification data 233 (e.g., in an XML (extensible markup language) document, examples described below) to the registered-user data source 240 for use in providing media content and, in some applications, for storing in the class/classification storage 244.

In some applications, a one-time classification and storage sequence is effected between the remote-user device 210 and any other remote-user devices to which the registered-user media source 240 provides data. When a remote user accesses the browser gateway 220 with a particular remote-user device for the first time, the browser obtains information from the remote-user device, either as part of the remote-user access or by initiating a discovery sequence to obtain information from the remote-user device. Classification data 233, which includes an actual device class, classification information and/or information sufficient for ascertaining such class or classification information, is provided to the registered-user data source 240. This information may, for example, include an Internet cookie or other similar information specifying a class for the remote-user device as well as configuration information (e.g., specifying a media content format for the device) which are stored together in the class/classification storage 244. Once stored, this information is subsequently used in providing media content to the remote-user device, such as by facilitating a configuration of data at the registered-user device 240 and, in some applications, by providing information to the agent gateway 230, which uses the information in configuring (or directing the configuration of) data for the remote-user device.

Classification of a particular remote device 210 (by way of example) is carried out at one or more of the browser gateway 220, agent gateway 230 or agent processor implemented at the registered-user data source 240. In some applications, devices are classified using rules that are applied (e.g., in a deterministic order) to information characterizing the remote device 210, to fit the devices into a particular predefined class (e.g., as relative to transcoding, protocol or interface attributes as described above). The number of classes may vary, depending upon the application, but generally includes at least two or three different classes to facilitate the tailoring of data in a manner amenable to efficient and desirable use at a remote playback device.

In one application, a classification server 260 provides classification data for remote devices accessing the browser gateway 220 and returns information to the browser gateway 220 and/or the agent gateway 230 for use in providing appropriate classification data for the remote devices. As with the discussion above regarding the browser and agent gateways 210 and 220, some or all of the classification server 260 may be implemented in connection with a host server arrangement (e.g., 110 in FIG. 1) on a common device or separately, or separately as shown with corresponding communications therebetween.

In one embodiment, the classification server 260 presents a single "device rule" XML document describing both device classification rules and device class descriptions to the agent gateway 230, which in turn provides the XML document to the agent processor at the registered-user data source 240. Individual devices accessing the system are classified at the browser gateway 220, which may, for example, place the device class name in a an HTTP cookie (e.g., a "ClassInfo" cookie) that is used in a manner as described above. Once classified, components of the system 200 (browser gateway 220, agent gateway 230 and agent processor at the registered-user data source 240) use the device class name contained in the ClassInfo cookie to retrieve device class parameters from the Device Rule document. In addition, these parameters can be made available to all XSL (extensible stylesheet language) processing in the system 200 by adding the class description XML to the XML passed to the stylesheet.

In a more particular example embodiment, device classification is carried out as follows, using the aforesaid provided XML document and related approach. The XML document includes a collection of device classification rules that are used to map specific HTTP header values to a device classification, with attributes such as those described above. Each device classification rule has the following attributes: order, classification, and expression. The order defines the order in which classification rules are to be applied to a request from a remote-user device. One or more of the components of the system 200 that implement the rules first sort the classification rules by their order attribute and then apply the rules in ascending order. The classification identifies the device classification to be used when the rule matches the request. The expression defines the logic to be applied when attempting to match the rule to a request. Where no device classification rules match a request, a default device class is used.

Expressions implemented with classification rules are implemented in one or more of a variety of manners. For most embodiments, the expression defines an HTTP header and a string value to search for within the header value. In some embodiments, relatively more complex expressions are used and may, for example, involve one or more of combining multiple headers with AND/OR logic, and supporting some form of regular expressions.

The device class configuration is organized and implemented in one or more of a variety of manners. In some embodiments, devices classes are organized in multiple tree structures. In each tree, each class has a single base device class, and zero or more derived device classes. For instance, a particular tree may involve a particular base device class and multiple subclasses for the base device class, where each subclass may further act as a base device class relative to other subclasses.

Each device class defines a collection of attributes that are used by the components of the system to provide runtime parameterization of system behavior. Each device class inherits the attributes of its base device class; however, each device class is further able to override attributes of its base device class in accordance with various examples. For instance, the attributes of any given device class, x, can be computed by traversing the tree from x toward the root. The attributes of each device class visited are examined and added to x if the attribute is not already present.

In some implementations, one device classification can be flagged as the default device class as discussed above. This default device class is used to assign a device class when no classification rules match the request, or if a request is received from a remote-user device without classification information such as a "ClassInfo" cookie when such information is expected.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the functions carried out by servers, media content sources, playlist managing devices (including software-implemented devices), and network caches are selectively implemented together and/or in different arrangements, depending upon the application. Further, media playlist content sources are selectively implemented with mobile-type devices, such as mobile Internet appliances (e.g., mobile telephones, laptops or personal devices); media content can be made available from such devices to other remote devices. These approaches are implemented in connection with various example embodiments of the present invention. Such modifications and changes do not depart from the true spirit and scope of the present invention, including that set forth in the following claims.

What is claimed is:

1. A method for processing data, information, or at least one signal, the method comprising:
   communicating, via at least one processor with a plurality of remote users and a plurality of registered-user media content sources over a network, to deliver requested media content to the remote users, and to authenticate, via the at least one processor, remote users
   requesting the delivery of media content to a classified remote playback device; establishing a communication link, over the network, with an agent processor located on at least one of the plurality of registered-user media content sources, and facilitating the delivery of media content from the at least one of the plurality of media content sources over the network;
   controlling, via the established communication link, and responsive to media requests from authenticated remote users, the agent processor located on at least one of the plurality of registered-user media content sources to facilitate the delivery of requested media content to at least one remote playback device over the network; and
   selectively configuring the requested media content as a function of classification rules for a device class to which the at least one remote playback device is classified.

2. The method of claim 1, wherein
   the network is a public data network,
   the plurality of registered-user media content sources include content sources operated by different users coupled to the public data network at disparate geographical locations,
   the agent processor is a computer that is programmed to execute a program to establish the communication link over the public data network, and to facilitate the delivery of media content from at least one of the plurality of the media content sources,
     the authentication of remote users sending media requests over the public data network is performed by authenticating different users for each content source based upon authentication criteria for the particular content source to which media requests are directed, and
     the delivery of the requested media content is made over the public data network to the at least one remote playback device via the agent processors located at respective media content sources for which the users are authenticated.

3. The method of claim 1, further comprising:
   establishing device classes for a plurality of remote playback devices, each of the device classes grouping one or more remote playback devices into a single class as a function of characteristics of the remote playback devices, and
   classifying each remote playback device to which requested media content is delivered as a function of characteristics of the remote playback device.

4. The method of claim 1, further comprising:
   associating device classes with media content configuration types and utilizing the association to facilitate the configuration of media content for playback at the at least one remote playback device.

5. The method of claim 1, further comprising:
   storing device rules including device class descriptions and device classification rules for each device class, and providing the device rules for use in configuring media content for playback at the at least one remote playback device.

6. The method of claim 1, further comprising:
   associating device classes with media content configuration types and providing a configuration file depicting the association to each agent processor, wherein each agent processor uses the configuration file and information characterizing a class for the at least one particular remote playback device to configure media content for playback at the at least one remote playback device.

7. The method of claim 1, further comprising:
   classifying each remote playback device using information provided by a remote user.

8. The method of claim 1, further comprising:
   classifying each remote playback device using information provided by a remote user,
   facilitating the storage of information characterizing each remote playback device's classification, and
   utilizing the stored information to determine the remote playback device's class for use in configuring media content for each of the remote playback devices.

9. The method of claim 1, further comprising:
   classifying each remote playback device using information provided by a remote user and
   sending class data identifying the classification to each of the remote playback devices, wherein the at least one remote playback device is configured to provide the classification to facilitate subsequent requests for media content delivery to the remote playback device.

10. The method of claim 1, further comprising:
    configuring the requested media content as a function of a classification of the at least one remote playback device by configuring the media content in accordance with a wireless access protocol (WAP) stack running on the at least one remote playback device.

11. The method of claim 1, further comprising:
    downloading configuration software to the agent processor; and
    controlling the agent processor to implement the configuration software to configure requested media content for playback at the at least one remote playback device.

12. An apparatus comprising:
    at least one processor; and
    at least one memory, including computer program code for one or more programs, the at least one memory and the computer program code configured to, with the at least one processor, cause the apparatus to perform at least the following:
    authenticate one or more users requesting media content delivery to one or more remote media playback devices;
    associate device classes with a set of device classification rules;
    classify each remote media playback device into one of the associated device classes;
    deliver content from registered-user media content sources to the one or more remote media playback devices; and
    deliver media content to an authenticated user at a remote media playback device as a function of both the device classification of the remote media playback device and the device classification rules associated with the device class.

13. The apparatus of claim 12, wherein the apparatus is further configured to provide a device rules document that describes device classes and device classification rules for the device classes,
- to provide the device rules document to each agent processor, and
- to use the device rules document and information identifying a class for a particular remote playback device to identify a configuration for media content to be delivered to the particular remote playback device.

14. The apparatus of claim 12, wherein the apparatus is further configured to provide a hypertext transfer protocol (HTTP) cookie to each classified remote media playback device, each HTTP cookie identifying the class of the remote media playback device to which it is provided.

15. The apparatus of claim 14, wherein the apparatus is further configured to retrieve the HTTP cookie from classified remote media playback devices and uses the retrieved HTTP cookie to facilitate the classification of the remote media playback device.

16. The apparatus of claim 12, wherein the apparatus is further configured to use the device classification rules to map specific HTTP header values to a device classification.

17. The apparatus of claim 12, wherein the apparatus is further configured to specify device classification rules that include, for each rule, an order, a classification, and an expression, wherein
- the order defines the order in which classification rules should be applied to a request, the classification identifies the device classification to be used when the rule matches a request, and
- the expression defines the logic to be applied when attempting to match the rule to a request,
- wherein the apparatus is configured to sort the classification rules by their order attribute and then apply the rules in ascending order.

18. The apparatus of claim 17, wherein the expression defines an HTTP header and a string value to search for within the header value.

19. The apparatus of claim 12, wherein the apparatus is further configured to classify remote playback devices into a default device class in response to the remote playback device failing to fall into a predefined device class.

20. The apparatus of claim 12, wherein the apparatus is further configured to organize device classification rules in tree structures involving base device classes that branch to other device classes that, in turn, may also act as base device classes for still other device classes, each base device class having attributes including classification rules, wherein each class
- has a single base device class,
- inherits attributes of its base device class, and
- has attributes that selectively override one or more attributes of its base device class.

21. A method comprising:
- determining to authenticate, via at least one processor operating in accordance with computer program code stored in a memory, one or more users requesting media content delivery from a registered-user media content source to one or more remote media playback devices, and delivering media content, which is received from the content source, to the one or more remote media playback devices;
- determining to associate device classes with a set of device classification rules;
- determining to classify each remote media playback device into one of the associated device classes; and
- at each registered-user media content source, in response to an agent gateway communicating with the content source over a network, determining to deliver media content to an authenticated user at a remote media playback device as a function of both the device classification of the remote media playback device and the device classification rules associated with the device class.

22. The method of claim 1, further comprising:
selective configuration of the requested media content as a function of classification rules for a device class to which the remote playback device is classified by selectively providing a portion of requested media content pertaining to subscription rules attributed to a subscription classification of the remote playback device.

23. The method of claim 1, further comprising:
selective configuration of the requested media content as a function of classification rules for a device class to which the remote playback device is classified by selectively decrypting requested media content for use at the remote playback device, based upon a playback classification of the remote playback device.

24. The method of claim 1, wherein the agent processor is a registered-user's personal computer that is programmed to execute a software program to initiate the communication link over the network.

* * * * *